United States Patent [19]

Petit

[11] Patent Number: 5,630,508

[45] Date of Patent: May 20, 1997

[54] CONTAINER FOR HOLDING FLAT, THIN OBJECTS

[75] Inventor: Robert G. Petit, Phillipston, Mass.

[73] Assignee: Microplas, Inc., Clinton, Mass.

[21] Appl. No.: 431,037

[22] Filed: Apr. 28, 1995

[51] Int. Cl.⁶ .................................................. B65D 43/22
[52] U.S. Cl. ..................... 206/387.1; 206/268; 206/509; 220/260; 220/324; 220/339
[58] Field of Search ................................ 206/265, 268, 206/273, 307, 309, 308.1, 308.3, 387.1, 387.13, 504, 509; 220/260, 315, 324, 326, 339; 229/160.1

[56] References Cited

U.S. PATENT DOCUMENTS

| | | |
|---|---|---|
| D. 298,515 | 11/1988 | Pennell . |
| 1,120,872 | 12/1914 | Weis . |
| 1,998,881 | 4/1935 | McGovern . |
| 2,809,766 | 10/1957 | Anderson . |
| 3,307,729 | 3/1967 | Schwartz .................. 206/504 |
| 3,327,887 | 6/1967 | Chalmers . |
| 3,874,581 | 4/1975 | Fox et al. . |
| 4,678,080 | 7/1987 | Nelson . |
| 4,696,397 | 9/1987 | Nakamats . |
| 4,733,794 | 3/1988 | Kent . |
| 4,733,796 | 3/1988 | Halverstadt et al. . |
| 4,735,309 | 4/1988 | Nemeth . |
| 4,753,383 | 6/1988 | Focke et al. ............... 229/160.1 |
| 4,759,443 | 7/1988 | Egly . |
| 4,779,756 | 10/1988 | Buelens et al. . |
| 4,801,004 | 1/1989 | Egly et al. . |
| 4,836,376 | 6/1989 | Posso . |
| 4,989,747 | 2/1991 | Demurger .................. 220/339 |
| 5,044,550 | 9/1991 | Lamm . |
| 5,097,948 | 3/1992 | Campbell . |
| 5,139,165 | 8/1992 | Hara ........................... 220/339 |
| 5,183,202 | 2/1993 | Love . |
| 5,314,114 | 5/1994 | Stone .......................... 229/160.1 |
| 5,341,925 | 8/1994 | Fleenor et al. . |
| 5,368,163 | 11/1994 | Gelardi . |
| 5,405,007 | 4/1995 | Iwahashi ..................... 206/387.1 |
| 5,417,339 | 5/1995 | Liu .............................. 220/326 |

FOREIGN PATENT DOCUMENTS

| | | |
|---|---|---|
| 2940421 | 4/1981 | Germany . |
| 2011353 | 7/1979 | United Kingdom . |

OTHER PUBLICATIONS

Sony Video 8 Container, model.

Primary Examiner—Jimmy G. Foster
Attorney, Agent, or Firm—James Creighton Wray

[57] ABSTRACT

A data cartridge case has a generally rectangular base and cover joined to the rear wall of the base by a living hinge. Top edge of the base front wall is lower than top edge of the rear wall. The top edge of the base front wall and the bottom edge of the cover front wall have horizontal outer portions and chamfered inner portions. Cover side walls have half-thickness lower sections overlapping half thickness forward sections of the base side walls. Upper horizontal edges of the half thickness portions of the base side walls abut complementary lower ledges of the cover side walls. Central rectangular inward projection on each cover side wall half thickness portion fits in a rectangular recess in each base side wall half thickness portion. Notches in the cover front walls allow finger pressure to frictionally raise the cover and to snap the rectangular projections out of the recesses. A groove extends across the entire cover front wall at the height of the hinge for receiving a hinge of an adjacent container. Inner surfaces of the base and flat outer surfaces of the front and rear walls of the base are tapered. Other outer surfaces of the base are formed with no draft ridges to provide straight stacking and prevent sliding. Inner cover side walls and upper portions of base side walls have abutting downward and forward sloping rear edges and horizontal lower edges for aligning the cover precisely with the base in a closed position.

20 Claims, 2 Drawing Sheets

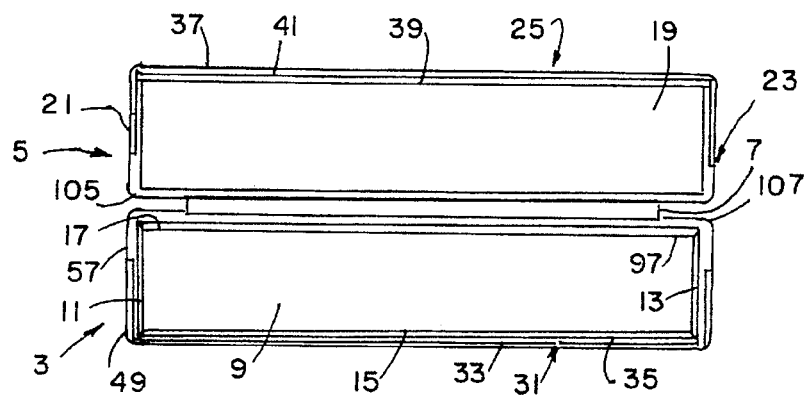
FIG. 4
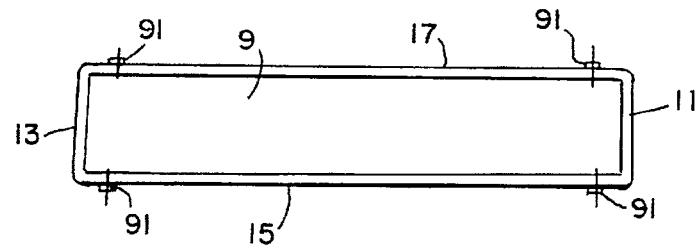
FIG. 5
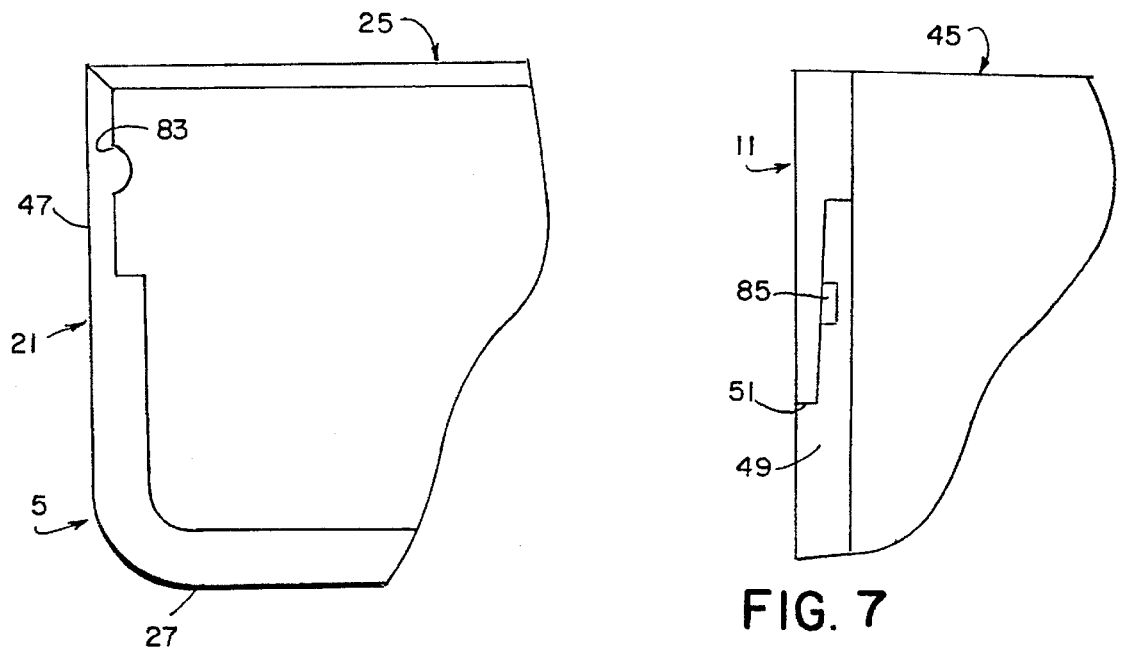
FIG. 6
FIG. 7

CONTAINER FOR HOLDING FLAT, THIN OBJECTS

BACKGROUND OF THE INVENTION

This invention relates to containers for holding flat thin objects such as 3.5" computer backup tape cartridges, also known as quarter inch cartridges or quarter inch data cartridges.

An increase in computer use has increased the demand for containers for holding files of computer disk backup cartridges for offline storage of data. Existing containers do not adequately address those needs.

Existing containers have large bulky halves which are difficult to open and if opened incorrectly dump the cartridge with attendant possibilities of damage to the cartridge and loss of availability of the stored data. Covers are the same size as the bases of the containers and are easily confused with the bases. Existing containers having connected covers are generally prone to unwanted release during handling, causing spillage of contents and damage to the cartridges. Efforts to minimize accidental release of container covers have led to expensive containers having covers which are difficult to disengage. Needs exist for containers having connected covers that remain closed during transport but open easily for cartridge removal and hold the cartridge positively upon opening.

Existing containers have large moving parts that increase the likelihood of part failure, decrease the lifetime of the container and increase costs. Reasonably priced containers quickly become useless as covers separate from the containers and cover grasps on the containers wear and break. Rugged transport conditions further limit the container's useful life. Needs exist for containers that have a limited number of parts and that are not prone to failure. Existing data cartridge containers require two hands to open and have the valuable cartridges balanced on one container half without control.

Manufacturing costs for containers must be minimized to effectively price the containers in the market. Existing cartridge containers have large hinged components which are molded flat in an open position. Large mold surfaces are required, thereby increasing costs of production. Needs exist for computer disk containers that are simple, inexpensive to produce, durable and high quality.

SUMMARY OF THE INVENTION

This invention provides new containers for storing and carrying compact data cartridges such as 3.5" quarter inch data cartridges and other flat, thin objects. The containers are manufactured from compact molds. The new containers have reliable and safe operations and durable covers which open with one hand, leaving the other hand free to remove the cartridges.

The present invention can be used to carry and store a variety of objects, including but not limited to compact data cartridges, toiletries such as Q-tips, and other small objects carried in purses and overnight bags.

The preferred container has a deep base, a cover and a hinge for connecting the cover to the base. The base includes a bottom, a pair of tapered side walls, a front wall and a rear wall with no draft ridges. The cover includes a top, a pair of side walls, a front wall and a short rear wall. The hinge connects the rear wall of the cover to the rear wall of the base. The cover and base are constructed such that the cover is precisely aligned with the base when the cover is closed, thereby creating a smooth-surfaced six-sided container. The base side walls have half thickness upper extensions with detents. The cover side walls have half thickness overlapping extensions with inward facing detents.

The rear wall of the base extends higher than the front wall of the base. The front wall of the cover extends further from the top of the cover than the rear wall of the cover. A coupler, such as a living hinge, joins the rear wall of the base to the rear wall of the cover. The top edge of the front wall of the base and the bottom edge of the front wall of the cover have horizontal outer abutting portions and complementary chamfered inner portions that provide a tight, secure fit. The lower side edges of the cover half thickness extensions on the side walls have inwardly chamfered edges to provide guidance during closing and to create a smooth fit when closed.

The side walls of the cover and the base hold the cover securely to the base when closed but readily release the cover for flipping open when finger pressure is exerted on the front wall of the cover. The lower portions of the cover side walls have half-thickness segments that overlap half-thickness inner segments of the upper portions of the base side walls. Upper horizontal ledges of the half-thickness outer segments of the base abut complementary inner edges at the ends of the outer segments of the cover side walls. The overlapping half thickness segments of the cover side walls and inner segments of the base side walls have complementary engaging detents. The outer segments of the cover side walls have inward extending, rounded, horizontally elongated projections. The projections are received by rectangular recesses with rounded ends in the inner segments of the base side walls. The projections of the cover side walls fit in the recesses of the base side walls such that the cover snaps into a tight fit with the base. When closed over the base, the cover walls are precisely aligned with the walls of the base. When closed, the walls of the cover are continuous with the complementary walls of the base.

At least one notch or surface irregularity is positioned in the lower center of the cover front wall. Preferably, plural notches extend horizontally to provide finger friction notches. Exerting thumb pressure on the notches allows a user to frictionally raise the cover and to snap the projections out of the recesses.

Inner surfaces of the base and flat outer surfaces of the side, front and rear walls of the base are tapered. Vertical ridges on front and rear outer surfaces of the base are formed with no draft to provide straight edges for abutting other surfaces. The front ridges are spaced slightly more apart so that the cooperating front and back ridges resist sliding when containers are stacked. The hinge forms an outward but horizontally extending curve when the cover is closed. The front of the cover has a complementary horizontally extending groove for receiving the hinge. The interfitting hinge and groove facilitate stacking and resist sliding.

In a preferred embodiment, the container has a base, a cover connected to the base, and a hinge connecting the cover to the base. The base has a bottom, a pair of base side walls extending from the bottom, a base front wall extending from the bottom and a base rear wall extending from the bottom. The cover has a top, a pair of cover side walls extending from the top, a cover front wall extending from the top, and a cover rear wall extending from the top. The base rear wall extends higher than the base front wall. The cover front wall is larger than the cover rear wall.

The base side walls have shaped upper portions with forward and rear segments. Each upper portion has a forward segment with a thickness approximately half of the thickness of the remainder of the base side walls. Rear segments have full thicknesses and have forward and downward sloping edges.

The cover side walls have upper and lower portions. Each lower portion has an approximately half thickness of the upper portion of the cover side wall. Forward and downward sloping rear edges on the cover side walls cooperate with the sloping edges on the upper segments of the base side walls.

Preferably, the cover is hinged to the base by a living hinge which flexes 180 degrees. The cover and base are molded with the cover rotated 180 degrees in the open position.

These and further and other objects and features of the invention are apparent in the disclosure, which includes the above and ongoing written specification, with the claims and the drawings.

BRIEF DESCRIPTION OF THE DRAWINGS

FIG. 4 is a top view of the case with the cover open 180 degrees.

FIG. 5 is a bottom view of the base.

FIG. 6 is a detail of the cover.

FIG. 7 is a detail of the half-thickness section of the base side wall having a recess for receiving the projection on the cover.

DETAILED DESCRIPTION OF THE PREFERRED EMBODIMENTS

Figure 1:
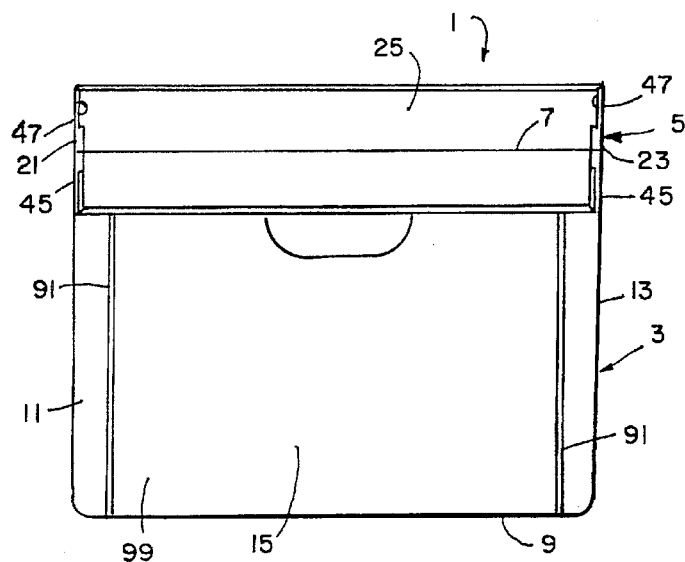
FIG. 1 is a front elevation of the case with the cover open 180 degrees.

As shown in FIGS. 1–7, a container 1 is constructed for holding objects for example compact, dense products such as 3.5" data cartridges with quarter inch tape. The container 1 has a base 3, a cover 5 and a hinge 7 for connecting the cover 5 to the base 3. The base 3 has a bottom 9, left and right base side walls 11 and 13, a base front wall 15 and a base rear wall 17. The base walls 11, 13, 15, 17 extend upward from rounded edges of the bottom 9. Preferably, the rectangular bottom 9 and the slightly sloped walls 11, 13, 15, 17 define a base 3 having generally rectangular cross-sections with rounded outer edges.

Figure 2:
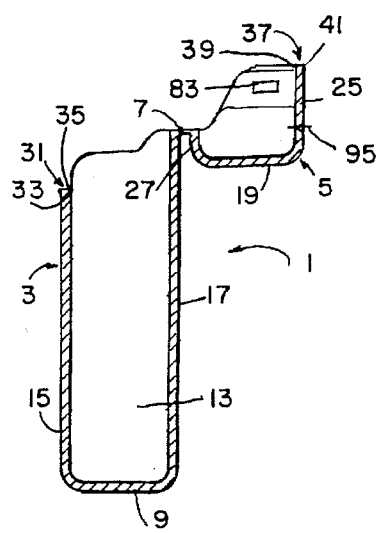
FIG. 2 is a cross-sectional side illustration of the case with the cover open 180 degrees.
Figure 3:
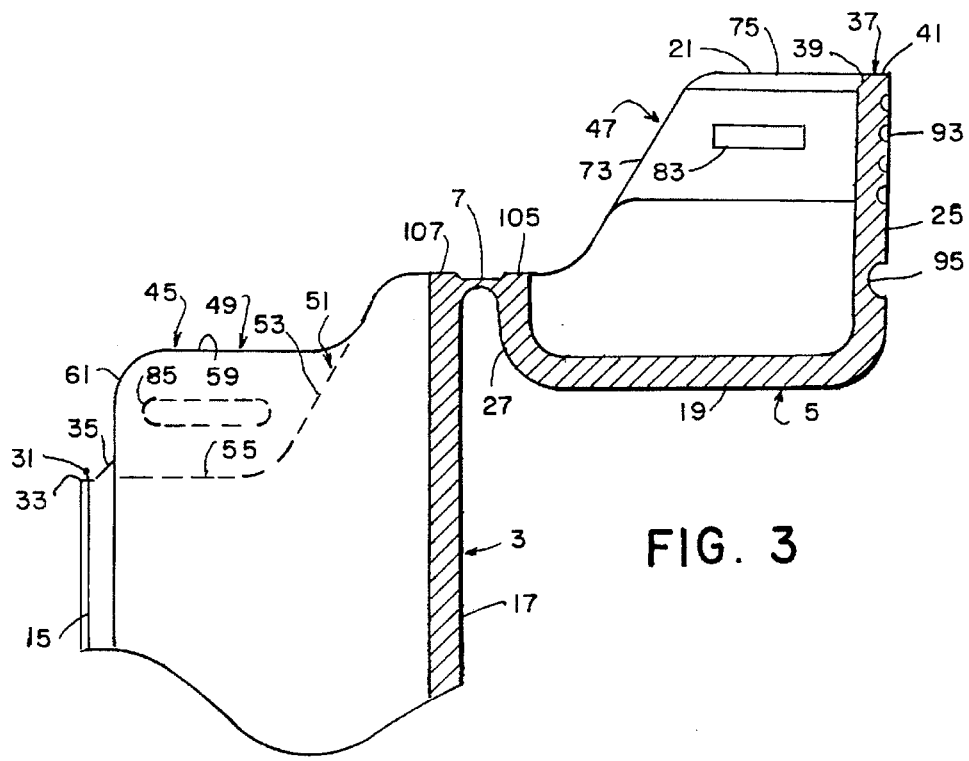
FIG. 3 is a cross-sectional side detail of the case with the cover open 180 degrees.

As shown in FIGS. 2 and 5, the base side walls 11, 13 extend upward from opposite side edges of the bottom 9. In preferred embodiments, the base side walls 11, 13 are slightly sloped for mold release and are generally parallel to each other. The base front wall 15 and base rear wall 17 also extend upward from opposite front and rear edges of the bottom 9 and are preferably slightly sloped and generally parallel to each other. As shown in FIGS. 1–3, the base rear wall 17 extends higher than the base front wall 15.

FIGS. 1–4 show a preferred embodiment of the cover 5 of the container 1. The cover 5 has a top 19, right and left cover side walls 21 and 23, a cover front wall 25 and a cover rear side wall 27. The cover walls 21, 23, 25, 27 extend downward from edges of the top 19. Preferably, the top 19 is rectangular and the cover walls 21, 23, 25, 27 define a cover 5 having generally rectangular cross-sections. As shown in FIGS. 2 and 3, the cover front wall 25 extends further from the base than the cover rear wall 27.

In preferred embodiments as shown in FIGS. 1 and 2, the top 19 of the cover 5 and the bottom 9 of the base 3 have generally identical dimensions. The cover walls 21, 23, 25, 27 and the base walls 11, 13, 15, 17 extend substantially at right angles to the cover top 19 and the base bottom 9, respectively, with slight angles to facilitate mold removal. A smooth, six-sided container is formed when the cover 5 is closed over the base 3. The cover walls 21, 23, 25, 27 abut complementary base walls 11, 13, 15, 17. The containers 1 are easy to stack and to store, as the closed containers have no protruding edges or overhanging ledges.

As shown in FIGS. 2–4, the base front wall 15 and the cover front wall 25 preferably have edges for aligning the respective walls of the cover 5 and the base 3. Preferably, the top edge 31 of the base front wall 15 has an horizontal outer portion 33 and a chamfered inner portion 35. The lower edge 37 of the cover front wall 25 has a horizontal outer part 39 and a chamfered inner part 41. When the cover 5 overlies the base 3, the horizontal outer portion 33 of the base front wall 15 and the horizontal outer part 39 of the cover front wall 25 rest together. Similarly, the chamfered inner portion 35 of the base front wall 15 rests along the chamfered inner part 41 of the cover front wall 25 when the cover 5 is closed over the base 3.

As shown in FIGS. 1 and 3, the upper portions 45 of the base side walls 11, 13 and the lower portions 47 of the cover side walls 21, 23 have complementary segments. The upper portions 45 of the base side walls 11, 13 have front segments 49 and rear segments 51. Segments 49 preferably have thicknesses approximately half the thickness of the remainder of the base side walls 11, 13. The thickness of segments 51 equals the width of the remainder of the base side walls 11, 13. The rear segment 51 has a forward and downward sloping edge 53 that extends from the rear wall 17. A horizontal half thickness middle edge 55 is continuous with the sloping edge 53 and extends to the front wall 15. The front segment 49 has a horizontal middle edge 55 and a vertical edge 61 that is spaced rearward from the base front wall 15. The upper horizontal edge 59 of the inner segment 49 is parallel to the horizontal middle edge 55.

The lower portions 47 of the cover side walls 21, 23 have half thicknesses and overlap the half thickness front segments 49 of the base side walls 11, 13. The lower portions 47 of the cover side walls have forward and downward sloping edges 73 extending from near the cover rear wall 27. Horizontal cover edges 75 are continuous with the sloping edges 73 and extending from the edges 73 to the front cover wall 25.

When the cover 5 is closed over the base 3, the sloping edges 73 of the cover 5 abut the sloping edges 53 of the base 3. The horizontal edges 75 of the cover abut the horizontal edges 55 of the base side walls 11, 13. The lower portions 47 of the cover side walls 21, 23 overlap the front segments 49 of the upper portions 45 of the base side walls 11, 13.

Connectors or detents 81 are positioned on the front segments 49 of the upper portions 45 of the base side walls 11, 13 and the lower portions 47 of the cover side walls 21, 23 for securing the cover 5 to the base 3. FIGS. 1–3 show a preferred embodiment of the present invention having a rounded projection 83 extending inward from the lower portion 47 of each cover side wall 21, 23. The projection 83 can have any size or shape. In one embodiment, the projection 83 is rectangular and rounded. A recess 85 is positioned in the front segment 49 of the upper portion 45 of each base side wall 11, 13 for receiving the projection 83 from the adjacent cover portion 47. The recess 85 can take any shape and dimension suitable for receiving and holding the projection 83. In an alternate configuration, a projection 83 extends outward from the front segment 49 of the upper portion 45 of each base side wall 11, 13 and the projection 83 is received by a recess 85 positioned in the lower portion 47 of each cover side wall 21, 23.

FIG. 6 is a detail of a cover 5 with a side wall 21. The projection 83 extends inward from the lower portion 47 of the cover side wall 21. The projection 83 has a half-cylindrical shape with rounded ends. The projection 83 is molded integrally with the cover 5 and the entire container 1.

FIG. 7 is a detail of a base side wall 11. A rectangular recess 85 with rounded ends is formed in the thin front segment 49 of the upper portion 45 of the base side wall 11. The recess 85 opens outward and does not extend through the full width of the front segment 49.

As shown in FIGS. 1 and 5, no draft ridges 91 extend vertically along the base front wall 15 and base rear wall 17. The ridges 91 allow the containers 1 to lie flat on surfaces and to be aligned when stacked. The ridges 91 on the front wall 15 are spaced slightly wider apart that the ridges 91 on the rear wall 17 to resist lateral sliding when the containers 1 are stacked.

FIG. 3 shows a preferred embodiment of the cover 5 having notches 93 positioned in the cover front wall 25. Preferably, the notches 93 are semicircular grooves with right angle edges, are horizontal and have depths and widths large enough for accepting part of a fingertip for increasing friction. In preferred embodiments, the notches 93 are positioned on the cover front wall 25. The notches 93 allow finger or thumb pressure to frictionally raise the cover 5 and to snap the projections 83 out of the recesses 85. Multiple notches 93 can be positioned in the cover front wall 25.

Groove 95 extends horizontally across the entire face of the cover 5 at the height of the hinge 7. Because the container 1 is molded with the cover 5 in the 180 degree open position, the living hinge 7 assumes an outward radius when the cover is closed. The semicylindrical groove 95 receives the semicylindrical hinge 7 allowing tight juxtaposing of the containers and resisting movement when the containers are stacked.

The container 1 has a flat bottom 9 and stands upright. As shown in FIG. 4, inner surfaces 97 of the base 3 are slightly tapered. As shown in FIG. 1, the flat outer surfaces 99 of the base front wall 15 and base rear wall 17 are slightly tapered. As shown in FIGS. 1 and 2, the outer ridges 91 of the base 3 are formed with no draft to provide straight surfaces when containers are aligned or stacked.

The cover 5 remains connected to the base 3 when the container 1 is open while providing safe holding of the contents during and after opening. The cover 5 and the base 3 are clearly distinguishable so that it is virtually impossible to incorrectly open the container and spill its contents. Preferably, the cover rear wall 27 is connected to the base rear wall 17. FIGS. 1–4 show a preferred embodiment of the present invention having a living hinge as the coupler 7 connecting the top edge 105 of the cover rear wall 27 to the edge 107 of the base rear wall 17.

The base 3 and cover 5 are molded together in a vertical position to provide economical molding using little mold space and presenting small surfaces which allow the container to be molded without requiring large closing forces for each part.

While the invention has been described with reference to specific embodiments, modifications and variations of the invention may be constructed without departing from the scope of the invention, which is defined in the following claims.

I claim:

1. A unitary molded container apparatus for holding thin, flat objects comprising a molded base, a molded cover connected to the base, and a coupler for connecting the cover to the base, wherein the base has a bottom, a pair of base side walls extending from the bottom, a base front wall extending from the bottom and a base rear wall extending from the bottom, wherein the cover has a top, a pair of cover side walls extending from the top, a cover front wall extending from the top, and a cover rear wall extending from the top, wherein the base rear wall extends higher than the base front wall, wherein the cover front wall is longer than the cover rear wall, wherein the base side walls have upper portions, each upper portion having a front segment having a thickness approximately half a thickness of the base side wall and having a width less than a width of the base side wall, and a rear segment having a width less than the width of the base side wall, the rear segment having a forward and downward sloping edge, a middle edge extending forward from the sloping edge along a bottom of the front segment, the front segment having an upper edge above the middle edge, and wherein the cover side walls have lower portions, each lower portion having a thickness approximately half a thickness of a remainder of the cover side wall and having a lower edge and a forward and downward sloping rear, wherein the upper portions of the base side walls and the lower portions of the cover side walls have connectors for holding the upper portions to the lower portions when the cover is closed over the base, and wherein the coupler extends between and connects the base rear wall to the cover rear wall.

2. The apparatus of claim 1, wherein the coupler is a hinge.

3. The apparatus of claim 2, wherein the hinge is a living hinge.

4. The apparatus of claim 1, wherein the cover and the base have generally rectangular cross-sections.

5. The apparatus of claim 1, further comprising notches in an outer surface of the cover front wall for providing friction upon finger pressure to disengage the connectors and to open the cover.

6. The apparatus of claim 4, wherein the notches are semicylindrical horizontal notches having widths and depths for partially receiving a fingertip.

7. The apparatus of claim 1, wherein the connectors comprise recesses in the front segments of the upper portions of the base side walls and projections extending inward from the lower portions of the cover side walls.

8. The apparatus of claim 7, wherein the recesses are generally rectangular and the projections are generally semicylindrical.

9. The apparatus of claim 1, wherein the connectors comprise recesses in the lower portions of the cover side walls and projections extending outward from the front segments of the upper portions of the base side walls.

10. The apparatus of claim 9, wherein the recesses are generally rectangular with rounded ends and the projections are generally semicylindrical with rounded ends.

11. The apparatus of claim 1, wherein the connectors comprise projections which are in half-cylindrical shapes and recesses which are generally rectangular.

12. The apparatus of claim 1, wherein the base front wall has a top edge having a horizontal outer portion and a chamfered inner portion, wherein the cover front wall has a lower edge having a horizontal outer part and a chamfered inner part, such that when the cover overlies the base the horizontal portion and horizontal part and the chamfered inner portion and chamfered inner part rest securely together.

13. A container apparatus for holding thin, flat objects comprising a base, a cover connected to the base, and a coupler for connecting the cover to the base, wherein the base has a bottom, a pair of base side walls extending from the bottom, a base front wall extending from the bottom and a base rear wall extending from the bottom, wherein the cover has a top, a pair of cover side walls extending from the top, a cover front wall extending from the top, and a cover rear wall extending from the top, wherein the base rear wall extends higher than the base front wall, wherein the cover front wall is longer than the cover rear wall, wherein the base side walls have upper portions, each upper portion having a front segment having a thickness approximately half a thickness of the base side wall, and a rear segment having a width less than the width of the base side wall, the rear segment having a forward and downward sloping edge and a middle edge extending forward from the sloping edge along a bottom of the front segment, the front segment having an upper edge above the middle edge, and wherein the cover side walls have lower portions, each lower portion having a thickness approximately half a thickness of a remainder of the cover side wall and having a lower edge and a forward and downward sloping rear, wherein the upper portions of the base side walls and the lower portions of the cover side walls have connectors for holding the upper portions to the lower portions when the cover is closed over the base, and wherein the coupler extends between and connects the base rear wall to the cover rear wall, wherein the base has tapered surfaces and ridges on outer surfaces having no draft, and wherein flat outer surfaces of the base front and rear walls are tapered.

14. A container apparatus for holding thin, flat objects comprising a base, a cover connected to the base, and a coupler for connecting the cover to the base, wherein the base has a bottom, a pair of base side walls extending from the bottom, a base front wall extending from the bottom and a base rear wall extending from the bottom, wherein the cover has a top, a pair of cover side walls extending from the top, a cover front wall extending from the top, and a cover rear wall extending from the top, wherein the base rear wall extends higher than the base front wall, wherein the cover front wall is longer than the cover rear wall, wherein the base side walls have upper portions, each upper portion having a front segment having a thickness approximately half a thickness of the base side wall, and a rear segment having a width less than the width of the base side wall, the rear segment having a forward and downward sloping edge and a middle edge extending forward from the sloping edge along a bottom of the front segment, the front segment having an upper edge above the middle edge, and wherein the cover side walls have lower portions, each lower portion having a thickness approximately half a thickness of a remainder of the cover side wall and having a lower edge and a forward and downward sloping rear, wherein the upper portions of the base side walls and the lower portions of the cover side walls have connectors for holding the upper portions to the lower portions when the cover is closed over the base, and wherein the coupler extends between and connects the base rear wall to the cover rear wall, wherein the coupler is a living hinge having an outward radius, and further comprising a horizontal groove extending across an outer surface of the cover front wall at a height of the hinge for receiving a hinge of an adjacent container.

15. The apparatus of claim 14, further comprising no draft ridges extending vertically along outer surfaces of the base front wall and the base rear wall.

16. The apparatus of claim 15, wherein the ridges on the base front wall are spaced slightly wider apart than the ridges on the base rear wall to resist lateral sliding of containers when the containers are stacked.

17. A quarter inch data cartridge case apparatus comprising a base, a cover, and a hinge for connecting the base to the cover, the base having a bottom, a front, a back and a pair of sides, the cover having a top, a front, a back and a pair of sides, wherein the base side walls have upper portions, each upper portion having a front segment having a thickness approximately half a thickness of the base side wall and a width less than a width of the base side wall, and a rear segment having a width less than the width of the base side wall, wherein the cover side walls have lower portions, each lower portion having a thickness approximately half a thickness of a remainder of the cover side wall and having a lower edge and a forward and downward sloping rear, and wherein the upper portions of the base side walls and the lower portions of the cover side walls have connectors for holding the upper portions to the lower portions when the cover is closed over the base.

18. The apparatus of claim 17, further comprising no draft ridges extending vertically along outer surfaces of the base front and the base rear, and wherein the ridges on the base front are spaced slightly wider apart than the ridges on the base rear to resist lateral sliding of containers when the containers are stacked.

19. A quarter inch data cartridge case apparatus comprising a base, a cover, and a hinge for connecting the base to the cover, the base having a bottom, a front, a back and a pair of sides, the cover having a top, a front, a back and a pair of sides, wherein the base side walls have upper portions, each upper portion having a front segment having a thickness approximately half a thickness of the base side wall and a width less than a width of the base side wall, and a rear segment having a width less than the width of the base side wall, wherein the cover side walls have lower portions, each lower portion having a thickness of approximately half a thickness of a remainder of the cover side wall and having a lower edge and a forward and downward sloping rear, and wherein the upper portions of the base side walls and the lower portions of the cover side walls have connectors for holding the upper portions to the lower portions when the cover is closed over the base, wherein the hinge is a living hinge having an outward radius, and further comprising a horizontal groove extending across an outer surface of the cover front at a height of the hinge for receiving a hinge of an adjacent container.

20. A unitary molded container apparatus for holding thin, flat objects comprising a molded base, a molded cover connected to the base, and a coupler for connecting the cover to the base, wherein the base has a bottom, a pair of base side walls extending from the bottom, a base front wall extending from the bottom and a base rear wall extending from the bottom, wherein the cover has a top, a pair of cover side walls extending from the top, a cover front wall extending from the top, and a cover rear wall extending from the top, wherein the base rear wall extends higher than the base front wall, wherein the cover front wall is longer than the cover rear wall, wherein the base front wall has a top edge having a horizontal outer portion and a chamfered inner portion, wherein the cover front wall has a lower edge having a horizontal outer part and a chamfered inner part, such that when the cover overlies the base the horizontal portion and horizontal part and the chamfered inner portion and chamfered inner part rest securely together, wherein the base side walls have upper portions, each upper portion having a front segment having a thickness approximately half a thickness of the base side wall and having a width less than a width of the base side wall, and a rear segment having a width less than the width of the base side wall, the rear segment having a forward and downward sloping edge and a middle edge extending forward from the sloping edge along a bottom of the front segment, the front segment having an upper edge above the middle edge, and wherein the cover side walls have lower portions, each lower portion having a thickness approximately half a thickness of a remainder of the cover side wall and having a lower edge and a forward and downward sloping rear edge, wherein upper portions of the base side walls have generally rectangular recesses with rounded ends and the lower portions of the cover side walls have generally semicylindrical, inward extending projections with rounded ends for holding the upper portions to the lower portions when the cover is closed over the base, wherein the coupler is a living hinge that extends between and connects the base rear wall to the cover rear wall, and wherein horizontal finger notches are positioned on an outer surface of the cover front wall.

* * * * *